Patented July 29, 1941

2,250,681

UNITED STATES PATENT OFFICE 2,250,681

ADHESIVE

George L. Schwartz, Wilmington, Del., assignor to E. I. du Pont de Nemours & Company, Wilmington, Del., a corporation of Delaware No Drawing. Application April 21, 1939, Serial No. 269,097

1 Claim. (Cl. 260—9)

This invention relates to adhesives, more particularly to quick-setting adhesives, and still more particularly to an adhesive comprising polyvinyl alcohols. This application is a continuation-in-part of copending application Serial No. 211,296 filed June 1, 1938.

In the manufacture of laminated paper, as well as in the joining of rolls of paper to be used on high-speed machines, it is desirable to make the necessary bonds with a rapidly setting adhesive that will give a bond strength at least equal to the tensile strength of the paper. Into this class of bonding falls pasting operations as well as certain types of bonding where the bonding is made to "Cellophane," cloth, wood or leather. Adhesives that have been developed in the past for performing such an operation have definite limitations. Examples of such adhesives are sodium silicate solutions and starch solutions. Both of these have proven unsatisfactory for both are sensitive to water and the presence of water causes the weakening of the bond. Moreover, sodium silicate is so alkaline that it destroys the sizing effect of rosin when used on paper while starch, being a food material, is susceptible to attack by vermin. Other adhesives of vegetable and animal origin, while having specific valuable properties, are all subject to attack by vermin and molds. Moreover, while these above mentioned adhesives furnish a reasonably strong bond, yet the bond cannot compare in strength to the bond produced by the adhesive which has been discovered and which is described herein.

An object of this invention is to quickly cement cellulosic materials to other cellulosic materials. Another object is to quickly cement colored films to cellulosic materials. Still another object is to produce an adhesive which will be quick-setting and furnish a strong bond. Another object is to produce an adhesive that has no deleterious effect on the original properties of the substances joined together. Still another object is to produce a quick-setting adhesive of such bond strength that less adhesive may be used than heretofore required when sodium silicate, starch, or casein adhesives were used. Another object is to provide an adhesive that will produce a vermin-proof bond. Another object is to provide an adhesive that will produce a mold-proof bond. Another object is to provide an adhesive that does not distort the pasted material in the drying process. Other objects will be apparent from the reading of the following description of the invention.

The above objects are accomplished by an adhesive comprising an aqueous solution of a polyvinyl alcohol with a finely divided unhydrolyzed starch-like material suspended therein. The bond is accomplished by applying the adhesive to the materials to be bonded, bringing the materials together at the bond and applying heat to said bond.

The following examples in which parts are by weight set forth certain well defined instances of the application of this invention. They are, however, not to be considered as limitations thereof, since many modifications may be made without departing from the spirit and scope of this invention.

Example 1

| | Parts |
|---|---|
| Polyvinyl alcohol 3% solution (intrinsic viscosity based on 4% solution at 25° C., 54 centipoises) | 100.00 |
| Potato starch dry and unswollen | 25.00 |

These ingredients were mixed at 30° C. by passing once through a dispersion mill.

A strip two inches wide on a sheet of 80 lb. kraft paper was spread with this paste to the extent of 2.3 lbs. solids per 1000 sq. ft. Another sheet of the same paper was placed against this pasted area and the two sheets were pressed on a cast iron steam table (heated with free flowing steam) to a surface pressure of 5 lbs. per sq. in. In 0.5 second heating, the bond was so strong that the sheets could not be separated without tearing. Some pasted sheets after the heat treatment were dried at room temperature and some were dried in a heated oven. In both cases there was no sheet distortion during and after drying. Sheets that were pasted with 3% solution polyvinyl alcohol of the above intrinsic viscosity required 70 to 90 seconds heat for bonding and they curled badly on drying. The bond had a considerably greater strength after submersion in cold water for one hour than starch or sodium silicate bonded sheets.

Example 2

| | Parts |
|---|---|
| A 4% solution of polyvinyl alcohol (intrinsic viscosity based on 4% solution at 25° C., 49 centipoises) | 100.00 |
| High viscosity corn starch dry and unswollen | 30.00 |
| Ammonium chloride | 0.05 |
| 10% solution of formaldehyde | 0.30 |

These ingredients were mixed at 30° C. by passage through a dispersion mill.

A piece of 8 oz. unbleached muslin was painted with a strip 2 inches wide across one end of a roll applied to such a thickness that 3.5 lbs. solids covered one thousand square feet. The end of another roll of muslin was pressed down on this strip and the pasted part was pressed against a metal steam table for two minutes at a temperature of 115° C. under a pressure of five pounds per square inch. After this heat treatment, the bond was completely dry and the sheet was not shrunken at the splice. The adhesive bond was water resistant enough to permit many passages of the roll through a water washing bath.

*Example 3*

| | Parts |
|---|---|
| A 4% solution of polyvinyl alcohol (intrinsic viscosity based on 4% solution at 25° C., 49 centipoises) | 100.00 |
| High viscosity tapioca starch dry and unswollen | 35.00 |

These ingredients were mixed at 30° C. by passing once through a dispersion mill.

A piece of chip board 0.024" thick and weighing 240 lbs. per ream was pasted on one side with this paste, applying a coating of such thickness that 2.6 lbs. solids covered 1000 sq. ft. The cloth side of a pyroxylin coated fabric was pressed against this at 5 lbs. per sq. in. against a cast iron steam table heated with free flowing steam. After two seconds pressure the bond was set enough so that the chip board could be removed from the cloth only by tearing the sheet. There was no warping during or after drying.

*Example 4*

Using the same adhesive composition as that recorded in Example 2, a very porous sheet, made from artificially crinkled kraft fibers, was printed in a fine pattern while one side was supported by a smooth surface cast iron steam table (heated to 140° C. with steam). An impression of 0.9 second under 5 lbs. per sq. in. pressure caused the adhesive to "set" so that the compressed areas were about 25% the original thickness, leaving the material with an uneven surface. This sheet was heated 15 minutes longer at 105° C. It could be wet readily with water and was highly absorbent, but it was not weakened appreciably by water. The printed pattern contained very fine squares (0.04 centimeter faces) and they were spaced 0.06 centimeter apart.

*Example 5*

| | Parts |
|---|---|
| A 4% solution of polyvinyl alcohol (intrinsic viscosity based on 4% solution at 25° C., 49 centipoises) | 100.00 |
| Water soluble methyl violet | 0.01 |
| High viscosity con starch dry and unswollen | 35.00 |

These ingredients were mixed by one passage through a dispersion mill.

Regular newsprint paper was printed by means of a rotogravure plate. The freshly printed sheet was passed over a roll heated with free flowing steam (unprinted side against roll) and within 1.2 seconds after pressing, the ink did not smudge. It showed very sharp definition, gave a highly polished surface, and contained no unpleasant odors.

*Example 6*

Strips of a five-ounce bleached cotton sheeting of basket weave with 77 x 72 threads per inch were cut in the warp direction and pasted in 1.5-inch strips with the following adhesive composition. Promptly after the paste was applied the pasted strips were combined to unpasted strips of the same cloth and placed on a hot plate under a weight of 2 pounds per square inch. The hot plate was heated with free flowing steam. Adhesive temperatures, amount applied per square yard, time of heating, and adhesive strength are given in the accompanying table. After the pasted strips were heated they were trimmed to 1.0-inch widths and conditioned at 25° C. and 50% relative humidity for 20 hours. The adhesive strength was measured with a small Scott tensile tester, fitted with automatic continuous strength recording equipment.

| Adhesive composition | Temperature of paste | Ounces of solids per sq. yd. | Heating time | Adhesive strength per 1" width |
|---|---|---|---|---|
| | °C. | | Seconds | |
| Polyvinyl alcohol 4% solution—80 parts. Dry globe starch—20 parts | 25 | 1.27 | 10 | 5.3 lbs. |
| Polyvinyl alcohol 4% solution—80 parts. Dry globe starch—20 parts | 25 | 1.27 | 120 | 3.6 lbs. |
| Polyvinyl alcohol 5% solution | 25 | 0.63 | 120 | No adhesion. |
| Polyvinyl alcohol 10% solution | 25 | 1.27 | 120 | Do. |
| Cooked globe starch 8% solution | 25 | 1.10 | 120 | Do. |
| Cooked globe starch 12% solution | 75 | 1.40 | 120 | 2.2 lbs. |
| Cooked globe starch 12% solution | 75 | 1.40 | 180 | 2.4 lbs. |
| Cooked tapioca starch 35% solution | 60 | 1.27 | 120 | 0.1 lb. |

The polyvinyl alcohol in Example 6 is of the type that is hot water soluble, of low viscosity and of low saponification number. It was selected because of its good working properties, especially the property of making aqueous solutions of relatively high solids content without sacrifice of adhesive value. Even though the highest practicable concentration of polyvinyl alcohol was used for the test with polyvinyl alcohol alone, it penetrated the cloth so much that no bond was formed.

The Globe starch of Example 6 is a high viscosity cornstarch of commercial grade. The highest concentration that could be spread at 25° C. was 8%. At 12% solution concentration and at 75° C. it penetrated only slightly into the cloth. With this concentration, heating time of three minutes was required to dry the combined cloth completely.

The tapioca starch of Example 6 is an oxidized tapioca starch of excellent adhesive value for pigments. A solution containing 35% of this starch required a temperature of 60° C. for spreading. At this concentration and temperature it penetrated the cloth considerably.

The polyvinyl alcohol-unswollen starch adhesive composition of Example 6 had the best working properties of any of the adhesives tried. It had excellent strength directly after the 10 seconds' heating period and did not warp on drying further.

Polyvinyl alcohol is a tough, water-white, resin-like material which may be obtained by the hydrolysis of polymerized vinyl esters, such as polyvinyl acetate. Polyvinyl alcohol can be made in a number of modifications of various degrees of polymerization, the degree of polymerization depending largely upon the extent to which the compound from which it has been made has been polymerized. All of the modifications are to some extent soluble in water, the more highly polymerized being easily dissolved and producing higher viscosity solutions for equivalent concentrations. There are also a number of so-called partial derivatives of polyvinyl alcohol in which some of the hydroxyl groups in the molecule are replaced with other radicals such as ester radicals. Some partial derivatives may be produced by incomplete hydrolysis of polyvinyl esters or by the incomplete reaction of polyvinyl alcohol with aldehyde or with other compounds that react with hydroxyl groups. As would be expected, the properties of these types of polyvinyl alcohol vary in respect to the viscosity and the temperature at which they go into solution. All types of polyvinyl alcohol with a viscosity of over 1 centipoise (based on intrinsic viscosity in 4% solution at 25° C.) and not over 100 centipoises are suitable for use in this invention.

The polymers that are most useful in this invention are soluble in hot water and are slowly soluble to insoluble in cold water, but all of them once dissolved in hot water remain in aqueous solution when the solution is cooled. Polyvinyl alcohol can be made in a number of modifications at various degrees of polymerization, all of which are to some extent soluble in water. Cold water-soluble polyvinyl alcohols may be used where cold water resistance is not required. The more highly polymerized forms are characterized by being less soluble than the slightly polymerized forms. The so-called partial derivatives in which some of the hydroxyl groups are replaced by other radicals such as ester radicals are soluble in water to a greater or lesser extent, depending on the degree of hydroxyl group replacement and the degree of polymerization.

A large variety of starches may be used. The essential property is that the starch should be capable of being dispersed in very fine subdivisions and have a low cold water absorption. However, none of the modified starches should be used, such as those that are swollen by cold water.

Although in the examples only corn starch, tapioca starch and potato starch are cited, it has been found that any finely divided cereal material is useful which does not swell appreciably with cold water and which swells to a considerable extent by being heated in the presence of water. The ratio of polyvinyl alcohol-starch may be varied according to the viscosity of the polyvinyl alcohol used.

In the adhesive, in addition to the polyvinyl alcohol and starch-like material, there may be added pigments, dyes, wetting agents, insolubilizing agents, or water-repelling agents. However, the addition of these materials is not necessary for most purposes. The adhesives of this invention may be modified with thickeners such as chalk, clays, titanium oxide, etc. The heating of the section to be bonded may be accomplished by pressing a heated metal surface against the material at the place to be bonded. When bonding sheets of paper, the surface of the heating element is preferably maintained between about 70° C. and about 130° C. This temperature will of course vary with the material bonded, it being necessary to raise the temperature of the adhesive to the point where it quickly sets.

The limits of concentration of polyvinyl alcohol solution that may be used in the adhesives are dependent on the inherent viscosity of the polyvinyl alcohol that is selected. For a polyvinyl alcohol as used in Example 6, the lower concentration limit is about 1.5% and the upper concentration limit is about 10%. For higher viscosity polyvinyl alcohol the lower limit may be as low as 0.8% and the upper limit as high as 8.0%. In general, the concentration of the polyvinyl alcohol solution should be such that the paste spreads well at room temperature. This viscosity is affected somewhat by the amount of unswollen starch that is used.

The preferred range of unswollen starch to the polyvinyl alcohol solutions lies between 10–40 parts of starch to 90–60 parts of polyvinyl alcohol solution. Less than 10 parts of unswollen starch have very little beneficial effect; more than 40 parts reduce the adhesive strength too much.

The preferred temperature range for quick setting is 90° to 130° C. Temperatures as low as 70° C. may be used if the time of setting is increased. Temperatures above 130° C. may be used but such temperatures tend to degrade the paper and the bond.

This invention is applicable to all grades of paper, cloth, and to the application to either paper or cloth of solid materials that may be wetted by the polyvinyl alcohol solution such as glass, wood, leather, paperboard and cloth.

Adhesive compositions may be applied with a brush, with an inking pad by means of a roll, by means of a spreader knife, by means of print block, or by means of an engraved form.

The adhesives of this invention have the advantage of producing a bond that is relatively insensitive to water as compared to starch and sodium silicate bonds. This bond also does not attract vermin nor does it mold. In addition it requires considerably less adhesive—from one-third to one-seventh of that required by sodium silicate, starch or casein adhesives to produce an effective bond. Moreover, the bond produced by the adhesives of this invention has no deleterious effect on the material being bonded. For these reasons the discovery described herein represents a marked improvement in the art.

As many apparently and widely different embodiments of this invention can be made without departing from the spirit and scope thereof, it is to be understood that the invention is not limited except as described in the appended claim.

I claim:

An adhesive composition comprising finely divided unswollen unhydrolyzed starch suspended in an aqueous solution of a polyvinyl alcohol, said polyvinyl alcohol having a viscosity between 1 and 100 centipoises based on intrinsic viscosity in 4% solution at 25° C. and being present in the aqueous solution in an amount within the range of 0.8 to 10%, said starch and polyvinyl alcohol solution being of such amounts by weight that the ratio of starch to polyvinyl alcohol solution is within the range of from 10:90 to 40:60.

GEORGE L. SCHWARTZ.